(12) United States Patent
Ohuchi et al.

(10) Patent No.: US 6,301,305 B1
(45) Date of Patent: Oct. 9, 2001

(54) TRANSMITTING APPARATUS FOR OUTPUTTING A BINARY SIGNAL

(75) Inventors: Katsuhiro Ohuchi; Morio Sato, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/089,393

(22) Filed: Jun. 3, 1998

(30) Foreign Application Priority Data

Jun. 5, 1997 (JP) .................................................. 9-148254

(51) Int. Cl.[7] .............................. H04B 3/00; H04L 25/00
(52) U.S. Cl. ............................................................ 375/257
(58) Field of Search ............................... 375/257; 326/26, 326/27, 63, 75; 327/185, 208

(56) References Cited

U.S. PATENT DOCUMENTS

| | | |
|---|---|---|
| 4,385,394 * | 5/1983 | Pace ..................................... 375/257 |
| 5,164,617 | 11/1992 | Hanibuchi et al. . |
| 5,436,577 | 7/1995 | Lee . |

FOREIGN PATENT DOCUMENTS

| | | |
|---|---|---|
| 19829214 | 2/1999 | (DE) . |
| A5-292101 | 11/1993 | (JP) . |

* cited by examiner

Primary Examiner—Don N. Vo
(74) Attorney, Agent, or Firm—Birch, Stewart, Kolasch & Birch, LLP

(57) ABSTRACT

A transmitting apparatus of simple circuit configuration is provided as having turn off time (cut off delay time) of an output transistor shortened. The potential of a low-level signal is inputted to an input terminal of a first transistor through a resistor. The potential of a high-level signal is inputted to an input terminal of a second transistor through a resistor. A control circuit is connected to the input terminals of the first and second transistors and when a high-level signal is to be transmitted to the communication line, the control circuit enters a high-impedance state with respect to the input terminal of the first transistor and outputs a low-level signal to the input terminal of the second transistor. When a low-level signal is to be transmitted over the communication line, the control circuit outputs a high-level signal to the input terminal of the first transistor and develops a high-impedance state with respect to the input terminal of the second transistor.

23 Claims, 7 Drawing Sheets

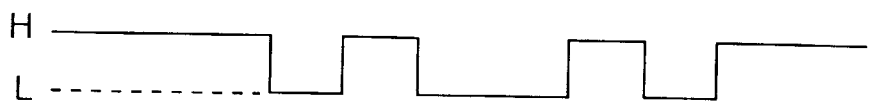
FIG. 2A
INPUT
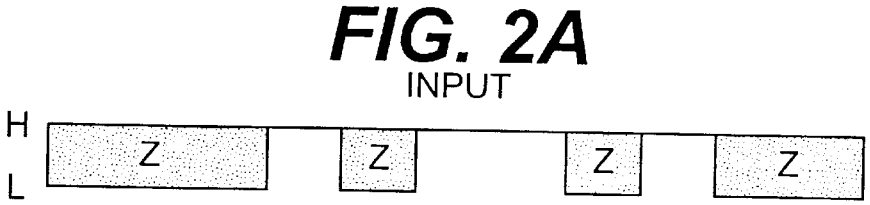
FIG. 2B
OUTPUT OF FIRST THREE STATUS BUFFER 51
FIG. 2C
OUTPUT OF SECOND THREE STATUS BUFFER 52
FIG. 2D
NONINVERTING OUTPUT
FIG. 2E
OUTPUT OF THIRD THREE STATUS BUFFER 53
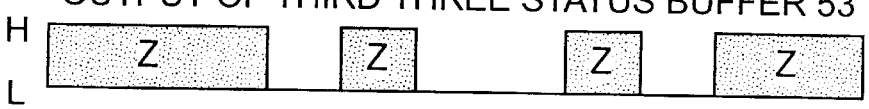
FIG. 2F
OUTPUT OF FOURTH THREE STATUS BUFFER 54
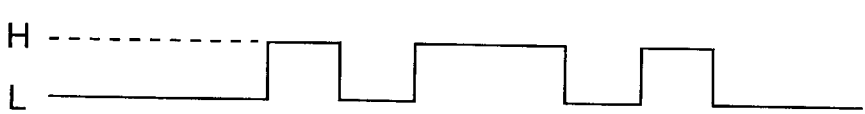
FIG. 2G
INVERTING OUTPUT
 HIGH-IMPEDANCE STATE       TIME →

TRANSMITTING APPARATUS FOR OUTPUTTING A BINARY SIGNAL

BACKGROUND OF THE INVENTION

1. Field of the Invention

The present invention relates to a transmitting apparatus for outputting a signal of binary levels over a communication line or the like.

2. Description of the Background Art

In Japanese Patent Laid-open No. Hei 5-292101, there is proposed a communication apparatus in which signals are exchanged among a plurality of communication units through a communication line. Each communication unit includes a transmitting circuit for alternately generating a high level signal or a low-level signal and for outputting the generated signal to the communication line. Each communication unit further includes a transmission control circuit for inputting a control signal to the transmitting circuit so that the transmitting circuit outputs the high-level signal or the low-level signal.

In Japanese Patent Laid-open No. Hei 5-292101, the communication apparatus is adapted to reduce the effect of stray capacitance between the communication line and ground which slows down communication, and hence to improve communication speed. The transmitting circuit includes a timing circuit for outputting a timing signal for a predetermined period of time after inversion of the level of the control signal from a first level to a second level, a first transistor responsive to the timing signal for outputting either of the high level signal and the low level signal, and a second transistor responsive to the inversion of the level of the control signal from the second level to the first level for outputting a signal at the other level to the communication line.

A further conventional type of transmitting apparatus is the so-called totem pole type in which a first transistor for outputting a high-level signal to a communication line and a second transistor for outputting a low-level signal to the communication line are connected in series and interposed between power source terminals. FIG. 6 is a circuit configuration diagram showing an example of a conventional totem pole type transmitting apparatus.

FIG. 6 illustrates transmitting apparatus 101 including a non-inverting signal output terminal 103 for outputting a signal having a same logical level as the logical level of transmitted data supplied to the data input terminal 102 and an inverting signal output terminal 104 for outputting a signal having a logical level obtained by reversing the logical level of the transmitted data supplied to the data input terminal 102. Transmitting apparatus 101 further includes an invertor (logically inverting circuit) 105 for inverting the logical level of the transmitted data supplied to the data input terminal 102 and two output circuits 106 and 107.

Output circuit 106 includes a PNP transistor Q1, an NPN transistor Q2, a P-channel enhancement field effect transistor Q3, an N-channel enhancement field effect transistor Q4, and the corresponding peripheral circuits for each of the respective transistors. The emitter of PNP transistor Q1 is connected to a positive power source V+ and the collector of PNP transistor Q1 is connected to the non-inverting output terminal 103. The base of PNP transistor Q1 is connected to the output terminal of invertor 105 through base resistor R1. The emitter of NPN transistor Q2 is connected to ground (or a negative power source) and the collector of NPN transistor Q2 is connected to non-inverting output terminal 103. The base of NPN transistor Q2 is connected to the output terminal of invertor 105 through base resistor R3. Non-inverting output terminal 103 is connected to positive power source V+ through pull-up resistor R5. When PNP transistor Q1 and NPN transistor Q2 are both in an OFF state (idle state), the logical level of non-inverting output terminal 103 is held at a HIGH level by means of pull-up resistor R5.

Output circuit 107 is substantially the same as output circuit 106 described above except that output terminal 104 is connected to ground through resistor R10. Also, there is no invertor inserted between the base inputs of transistors Q5 and Q6 and data input terminal 102 in output circuit 107. Operation of transmitting apparatus 101 will be described as follows.

Output circuit 106 is adapted such that the base currents of PNP transistor Q1 and NPN transistor Q2 are controlled in accordance with the output of invertor 105 such that either of transistors Q1 and Q2 are turned on based on the output of invertor 105. When the logical level of transmitted data supplied to data input terminal 102 is HIGH, the output of invertor 105 is brought to a LOW level. When the output of invertor 105 is LOW, no base current is supplied to NPN transistor Q2 and NPN transistor Q2 is thus brought to an OFF state. Meanwhile, since a base current is not supplied to PNP transistor Q1 through base resistor R1 in this case, PNP transistor Q1 is maintained in an ON state. Thereby, the output of the non-inverting output terminal 103 is brought to a HIGH level.

When the logical level of the transmitted data supplied to data input terminal 102 is LOW, the output of the invertor 105 is brought to a HIGH level. When the output of invertor 105 is HIGH, a base current is supplied to NPN transistor Q2 through base resistor R3 and NPN transistor Q2 is brought to an ON state. At the same time, PNP transistor Q1 is brought to an OFF state. Thereby, the output of non-inverting output terminal 103 is brought to a LOW level.

In bipolar transistors such as PNP transistors and NPN transistors, even when the supply of base current is cut off, a time delay is produced until the collector current is cut off by the effect of electric charge stored in the base region and the like. In order to shorten the cut-off delay time (turnoff time), conventional transmitting apparatus 101 includes a field effect transistor between the base and the emitter of each transistor. By turning the field effect transistor on to short-circuit the base with the emitter through a low impedance, charge on the base is forcibly discharged. By forcibly discharging the charge stored on the base, cut-off delay time (turn off time) can be shortened. This operation will be described as follows.

When the logical level of the transmitted data supplied to data input terminal 102 is HIGH, then P-channel enhancement field effect transistor Q3 is in an OFF state and PNP transistor Q1 is brought to an ON state by the LOW level output of invertor 105. When the logical level of the transmitted data supplied to data input terminal 102 is changed from HIGH level to LOW level, P-channel enhancement field effect transistor Q3 is brought to an ON state. By turning on P-channel enhancement field effect transistor Q3, the charge stored on the base of PNP transistor Q1 is forcibly discharged. Thereby, the cut-off delay time (turn off time) of PNP transistor Q1 is shortened.

On the other hand, when the logical level of the transmitted data supplied to data input terminal 102 is LOW, N-channel enhancement field effect transistor Q4 is in an OFF state and NPN transistor Q2 is brought to an ON state by the HIGH level output of invertor 105. When the logical level of the transmitted data supplied to data input terminal 102 is changed from LOW level to HIGH level, N-channel enhancement field effect transistor Q4 is brought to an ON state. By turning on N-channel enhancement field effect transistor Q4, the charge stored on the base of NPN transistor Q2 is forcibly discharged. Thereby, the cut-off delay time (turn off time) of NPN transistor Q2 is shortened.

Since conventional transmitting apparatus 101 of FIG. 6 employs field effect transistors for shortening the cut-off delay time (turn off time) of the bipolar transistors, the number of discrete components constituting each of output circuits 106 and 107 is increased. It is therefore considered advantageous to provide circuits for shortening cut-off delay time (turn off time) of bipolar transistors as in the form of an integrated circuit (IC) by employing three-status buffers as will be described as follows.

FIG. 7 is a circuit configuration diagram of a transmitting apparatus adapted to shorten cut-off delay time (turn off time) of bipolar transistors by the use of three-status buffers. The transmitting apparatus 111 shown in FIG. 7 includes a logical circuit portion 112 and output circuits 113 and 114. The logical circuit portion 112 can be provided in the form of an IC with the logical circuit portions put together. Each of output circuits 113 and 114 are realized by eliminating the field effect transistors from each of output circuits 106 and 107 of FIG. 6. Otherwise, the circuit configuration of output circuits 113 and 114 are the same as the circuit configurations of output circuits 106 and 107 of FIG. 6.

Logical circuit portion 112 includes an invertor 105 and four three-status buffers G1–G4. The input terminal G1a of first three-status buffer G1 is connected to the output terminal of invertor 105. The output terminal G1b of first three-status buffer G1 is connected to the base of PNP transistor Q1. The output enable terminal G1c of first three-status buffer G1 is connected to the output terminal of invertor 105.

First three-status buffer G1, when the logical level of the output enable signal supplied to output enable terminal G1c is LOW, brings output terminal G1b to a high-impedance state. When the logical level of the output enable signal supplied to output enable terminal G1c is HIGH, first three-status buffer G1 outputs a signal at the same logical level as the logical level of the input signal supplied to input terminal G1a. The output impedance of first three-status buffer G1 is sufficiently smaller than the resistance value of base-emitter resistor R2 of PNP transistor Q1. Operation of the first three-status buffer G1 will be briefly described as follows.

When the logical level of the transmitted data supplied to data input terminal 102 is HIGH, the output of invertor 105 is brought to a LOW level and the output enable terminal G1c of first three-status buffer G1 is brought to a LOW level. Hence, the output of first three-status buffer G1 is brought to a high-impedance state. In view of the low-level output of the invertor 105, no base current is supplied to PNP transistor Q1 through base resistor R1 and, PNP transistor Q1 is therefore maintained in an ON state. The output of non-inverting output terminal 103 is brought to a HIGH level.

When the logical level of the transmitted data supplied to data input terminal 102 is changed from a HIGH level to a LOW level, the output of invertor 105 is changed from a LOW level to a HIGH level and both output enable terminal G1c and input terminal G1a of first three-status buffer G1 are brought to a HIGH level. The output of first three-status buffer G1 is thus brought to a HIGH level. The base of PNP transistor Q1 is therefore brought to such a state that it is connected to the side of positive power source V+ by a low impedance through a high-level output transistor within first three-status buffer G1. Thus, it becomes possible to forcibly discharge the charge stored on the base of PNP transistor Q1 and shorten the cut-off delay time (turn off time).

With further regard to FIG. 6 and FIG. 7, when such a circuit configuration capable of short-circuiting the base and the emitter of a bipolar transistor by a low impedance is employed for shortening the turn off time of the bipolar transistor driving the output terminal, four signal lines are required to be placed between each output circuit and the logical circuit portion. Thus, the interface between the logical circuit portion and each output circuit becomes complicated. Furthermore, when it is attempted to fabricate the logical circuit portion as an IC, the number of output pins is undesirably increased.

When such a circuit configuration is employed in which a field effect transistor is used in place of the bipolar transistor driving the output terminal, the turn off time can be shortened by supplying through a low impedance a voltage to the gate of the field effect transistor for controlling the field effect transistor to be turned to an OFF state. However, there arises a problem similar to the above that the interface between the logical circuit portion and each output circuit becomes complicated.

SUMMARY OF THE INVENTION

The present invention was made to solve the above described problems. An object of the present invention is to therefore provide a transmitting apparatus of simple circuit configuration which is capable of shortening the turn off time of an output transistor.

According to the invention described above, there is provided a transmitting apparatus including a transmitting circuit for alternately generating a high-level signal and a low-level signal and transmitting the generated signal over a communication line; a control circuit for providing a control signal for controlling the transmitting circuit; a first transistor for activating the communication line to a HIGH level when the control signal is at a first level; and a second transistor for activating the communication line to a LOW level when the control signal is at a second level. The potential of the low-level signal is inputted to the input terminal of the first transistor through a resistor and the potential of the high-level signal is inputted to the input terminal of the second transistor through a resistor. The control circuit is connected to the input terminals of the transistors. The control circuit develops a high-impedance state with respect to the input terminal of the first transistor and outputs a low-level signal to the input terminal of the second transistor when a high-level signal is to be transmitted to the communication line. The control circuit further outputs a high-level signal to the input terminal of the first transistor and develops a high-impedance state with respect to the input terminal of the second transistor when a low-level signal is to be transmitted to the communication line.

In a preferred embodiment, the control circuit may be made up of three-status buffers. Each of the three-status buffers can output the low-level signal, output the high-level signal, and develop the high-impedance state.

In a further preferred embodiment, the first and second transistors may be bipolar transistors and the bases may be used as the inputs. The bipolar transistors can be controlled with their bases used as the inputs or input terminals.

In a still further preferred embodiment, the first and second transistors may be field effect transistors and the gates may be used as the inputs. The field effect transistors can be controlled with their gates used as the inputs or input terminals.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIG. 2 is a timing chart showing operation of the transmitting apparatus of FIG. 1;

DETAILED DESCRIPTION OF THE PREFERRED EMBODIMENT

Figure 1:
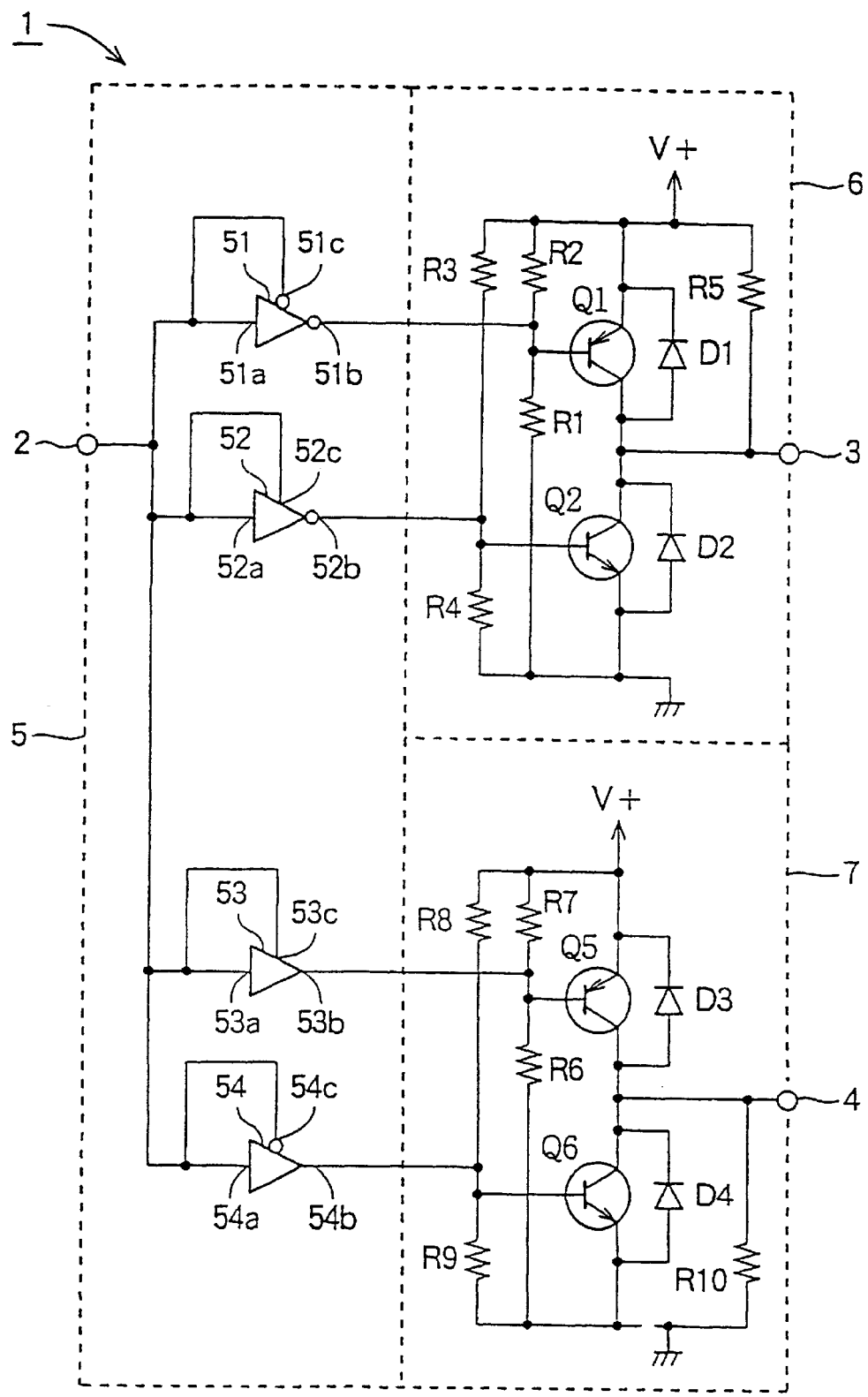
FIG. 1 is a circuit configuration diagram of a transmitting apparatus according to a first embodiment of the invention.

An embodiment of the invention will be described with reference to the accompanying drawings as follows. FIG. 1 is a circuit configuration diagram of a transmitting apparatus according to a preferred embodiment of the present invention. Transmitting apparatus 1 shown in FIG. 1 includes a non-inverting output terminal 3 for outputting the same logical level as the logical level of transmitted data supplied to data input terminal 2 and an inverting output terminal 4 for outputting the logical level obtained by reversing the logical level of the transmitted data supplied to data input terminal 2. Transmitting apparatus 1 further includes a logical circuit portion 5 and two output circuits 6 and 7. The data provided to data input terminal 2 may alternate between a high level signal (or data) and a low level signal (or data).

Output circuit 6 includes a PNP transistor Q1, an NPN transistor Q2, and corresponding peripheral circuits of transistors Q1 and Q2. The emitter of the PNP transistor Q1 is connected to positive power source V+ and the collector of PNP transistor Q1 is connected to non-inverting output terminal 3. The base of PNP transistor Q1 is connected to ground (or a negative power source) through base resistor R1. The resistance value of base resistor R1 is set so that it can supply a base current sufficient to control turning on of PNP transistor Q1. Base-emitter resistor R2 is connected in is parallel with the base-emitter circuit of PNP transistor Q1, although base-emitter resistor R2 is not necessary and may be dispensed with. Diode D1 is provided between the collector and the emitter of PNP transistor Q1 for protecting PNP transistor Q1 against backward voltage and backward current. As for diode D1, the cathode of diode D1 is connected to the emitter side of PNP transistor Q1 and anode of the diode D1 is connected to the collector side of PNP transistor Q1.

The emitter of NPN transistor Q2 is connected to ground (or a negative power source) and the collector of NPN transistor Q2 is connected to non-inverting output terminal 3. The base of NPN transistor Q2 is connected to positive power source V+ through a base resistor R3. The resistance value of base resistor R3 is set so that it can supply a base current sufficient to control turning on of NPN transistor Q2. Base-emitter resistor R4 is connected in parallel with the base-emitter circuit of NPN transistor Q2, although base-emitter resistor R4 is not necessary and may be dispensed with. Diode D2 is provided between the collector and the emitter of NPN transistor Q2 for protecting NPN transistor Q2 against backward voltage and backward current. As for diode D2, the cathode of diode D2 is connected to the collector side of NPN transistor Q2 and the anode of diode D2 is connected to the emitter side of NPN transistor Q2. Non-inverting output terminal 3 is connected to positive power source V+ through a pull-up resistor R5.

The other output circuit 7 is made up of PNP transistor Q5, NPN transistor Q6, and corresponding peripheral circuits of transistors Q5 and Q6. The emitter of the PNP transistor Q5 is connected to positive power source V+ and the collector of PNP transistor Q5 is connected to inverting output terminal 4. The base of PNP transistor Q5 is connected to ground (or a negative power source) through base resistor R6. The resistance value of base resistor R6 is set so that it can supply a base current sufficient to control turning on of PNP transistor Q5. Base-emitter resistor R7 is connected in parallel with the base-emitter circuit of PNP transistor Q5, although base-emitter resistor R7 is not necessary and may be dispensed with. Diode D3 is provided between the collector and the emitter of PNP transistor Q5 for protecting PNP transistor Q5 against backward voltage and backward current. As for diode D3, the cathode of diode D3 is connected to the emitter side of PNP transistor Q5 and the anode of diode D3 is connected to the collector side of PNP transistor Q5.

The emitter of NPN transistor Q6 is connected to ground (or a negative power source) and the collector of NPN transistor Q6 is connected to inverting output terminal 4. The base of NPN transistor Q6 is connected to positive power source V+ through base resistor R8. The resistance value of base resistor R8 is set so that it can supply a base current sufficient to control turning on of NPN transistor Q6. Base-emitter resistor R9 is connected in parallel with the base-emitter circuit of NPN transistor Q6, although base-emitter resistor R9 is not necessary and may be dispensed with. Diode D4 is provided between the collector and the emitter of NPN transistor Q6 for protecting NPN transistor Q6 against backward voltage and backward current. As for diode D4, the cathode of diode D4 is connected to the collector side of NPN transistor Q6 and the anode of diode D4 is connected to the emitter side of NPN transistor Q6.

Inverting output terminal 4 is connected to ground (or a negative power source) through a pull-down resistor R10. When PNP transistor Q5 and NPN transistor Q6 are both in an OFF state (idle state), the logical level of inverting output terminal 4 is held at a LOW level by means of pull-down resistor R10.

The logical circuit portion 5 is made up of four three-status buffers 51, 52, 53, and 54. Input terminal 51a of first three-status buffer 51 is connected to data input terminal 2. Output terminal 51b of first three-status buffer 51 is connected to base of the PNP transistor Q1. Output enable terminal 51c of first three-status buffer 51 is connected to data input terminal 2.

When the logical level of the output enable signal supplied to output enable terminal 51c is HIGH, first three-status buffer 51 brings its output terminal 51b to a high-impedance state. When the logical level of the output enable signal supplied to output enable terminal 51c is LOW, first three-status buffer 51 outputs a signal via output terminal 516 at the logical level obtained by reversing the logical level of the input signal supplied to input terminal 51a. First three-status buffer 51 outputs, as the high level output, the voltage of the positive power source V+ through a low impedance.

Input terminal 52a of second three-status buffer 52 is connected to data input terminal 2. Output terminal 52b of second three-status buffer 52 is connected to the base of NPN transistor Q2. Output enable terminal 52c of second three-status buffer 52 is connected to data input terminal 2.

When the logical level of the output enable signal supplied to output enable terminal 52c is LOW, second three-status buffer 52 brings its output terminal 52b to a high-impedance state. When the logical level of the output enable signal supplied to output enable terminal 52c is HIGH, second three-status buffer 52 outputs a signal via output terminal 52b at the logical level obtained by reversing the logical level of the input signal supplied to input terminal 52a. Second three-status buffer 52 outputs, as the low level output, the voltage of ground (or a negative power source) through a low impedance.

Input terminal 53a of a third three-status buffer 53 is connected to data input terminal 2. Output terminal 53b of third three-status buffer 53 is connected to the base of PNP transistor Q5. Output enable terminal 53c of third three-status buffer 53 is connected to data input terminal 2.

When the logical level of the output enable signal supplied to output enable terminal 53c is LOW, third three-status buffer 53 brings its output terminal 53b to a high-impedance state. When the logical level of the output enable signal supplied to output enable terminal 53c is HIGH, third three-status buffer 53 outputs a signal via output terminal 53b at a logical level which is the same as the logical level of the input signal supplied to input terminal 53a. Third three-status buffer 53 outputs, as the high level output, the voltage of positive power source V+ at a low impedance.

Input terminal 54a of fourth three-status buffer 54 is connected to data input terminal 2. Output terminal 54b of fourth three-status buffer 54 is connected to the base of NPN transistor Q6. Output enable terminal 54c of fourth three-status buffer 54 is connected to data input terminal 2.

When the logical level of the output enable signal supplied to output enable terminal 54c is HIGH, fourth three-status buffer 54 brings its output terminal 54b to a high-impedance state. When the logical level of the output enable signal supplied to output enable terminal 54c is LOW, fourth three-status buffer 54 outputs a signal via output terminal 54b at a logical level which is the same as the logical level of the input signal supplied to input terminal 54a. Fourth three-status buffer 54 outputs, as the low level output, the voltage of ground (or a negative power source) through a low impedance.

Operation of transmitting apparatus 1 shown in FIG. 1 will be described as follows. FIG. 2 is a timing chart showing the operation of transmitting apparatus shown in FIG. 1. When the transmitted data supplied to data input terminal 2 (the input shown in FIG. 2A) is at a HIGH level, then the output of first three-status buffer 51 is brought to a high-impedance state as shown in FIG. 2B and the output of the second three-status buffer 52 is brought to a LOW level as shown in FIG. 2C. Accordingly, a base current is supplied to PNP transistor Q1 through base resistor R1, whereby PNP transistor Q1 is brought to an ON state and NPN transistor Q2 is brought to an OFF state. Hence, the output of non-inverting output terminal 3 is brought to a HIGH level as shown in FIG. 2D.

When the transmitted data supplied to data input terminal 2 is brought to a LOW level, the output of first three-status buffer 51 is brought to a HIGH level as shown in FIG. 2B and the output of second three-status buffer 52 is brought to a high-impedance state as shown in FIG. 2C. Accordingly, PNP transistor Q1 is brought to an OFF state and a base current is supplied to NPN transistor Q2 through base resistor R3, whereby NPN transistor Q2 is brought to an ON state. Hence, the output of non-inverting output terminal 3 is brought to a LOW level as shown in FIG. 2D.

When the transmitted data supplied to the data input terminal 2 (the input shown in FIG. 2A) is at a HIGH level, then the output of third three-status buffer 53 is brought to a HIGH level as shown in FIG. 2E and the output of fourth three-status buffer 54 is brought to a high-impedance state as shown in FIG. 2F. Accordingly, PNP transistor Q5 is brought to an OFF state and a base current is supplied to NPN transistor Q6 through base resistor R8, whereby NPN transistor Q6 is brought to an ON state. Hence, the output of inverting output terminal 4 is brought to a LOW level as shown in FIG. 2G.

When the transmitted data supplied to data input terminal 2 is brought to a LOW level, the output of third three-status buffer 53 is brought to a high-impedance state as shown in FIG. 2E and the output of fourth three-status buffer 54 is brought to a LOW level as shown in FIG. 2F. Accordingly, a base current is supplied to PNP transistor Q5 through base resistor R6, whereby PNP transistor Q5 is brought to an ON state and NPN transistor Q6 is brought to an OFF state. Hence, the output of inverting output terminal 4 is brought to a HIGH level as shown in FIG. 2G.

Transmitting apparatus 1 as shown in FIG. 1 is adapted such that a base bias circuit is provided for holding PNP transistors Q1 and Q5 in an ON state. When PNP transistors Q1 and Q5 are to be turned off, the voltage of positive power source V+ is supplied from first and third three-status buffers 51 and 53 to the bases of PNP transistors Q1 and Q5 at a low impedance. Accordingly, it is possible to control turning off of each PNP transistors Q1 and Q5 via respective single signal lines. Further, in view of the supply of voltage of positive power source V+ to the bases of PNP transistors Q1 and Q5 at low impedance, the charge on the bases of PNP transistors Q1 and Q5 can be quickly discharged and, hence, the turn off time of PNP transistors Q1 and Q5 can be shortened.

Likewise, a base bias circuit is provided as part of transmitting apparatus 1 for holding NPN transistors Q2 and Q6 in an ON state. When NPN transistors Q2 and Q6 are to be turned off, the voltage of ground (or a negative power source) is supplied from second and fourth three-status buffers 52 and 54 to the bases of NPN transistors Q2 and Q6 through a low impedance. Accordingly, it is possible to control turning off of each of NPN transistors Q2 and Q6 via respective single signal lines. Further, in view of the supply of voltage of ground (or a negative power source) to the bases of NPN transistors Q2 and Q6 at a low impedance, the charge on the bases of NPN transistors Q2 and Q6 can be quickly discharged and, hence, the turn off time of NPN transistors Q2 and Q6 can be shortened.

Figure 3:
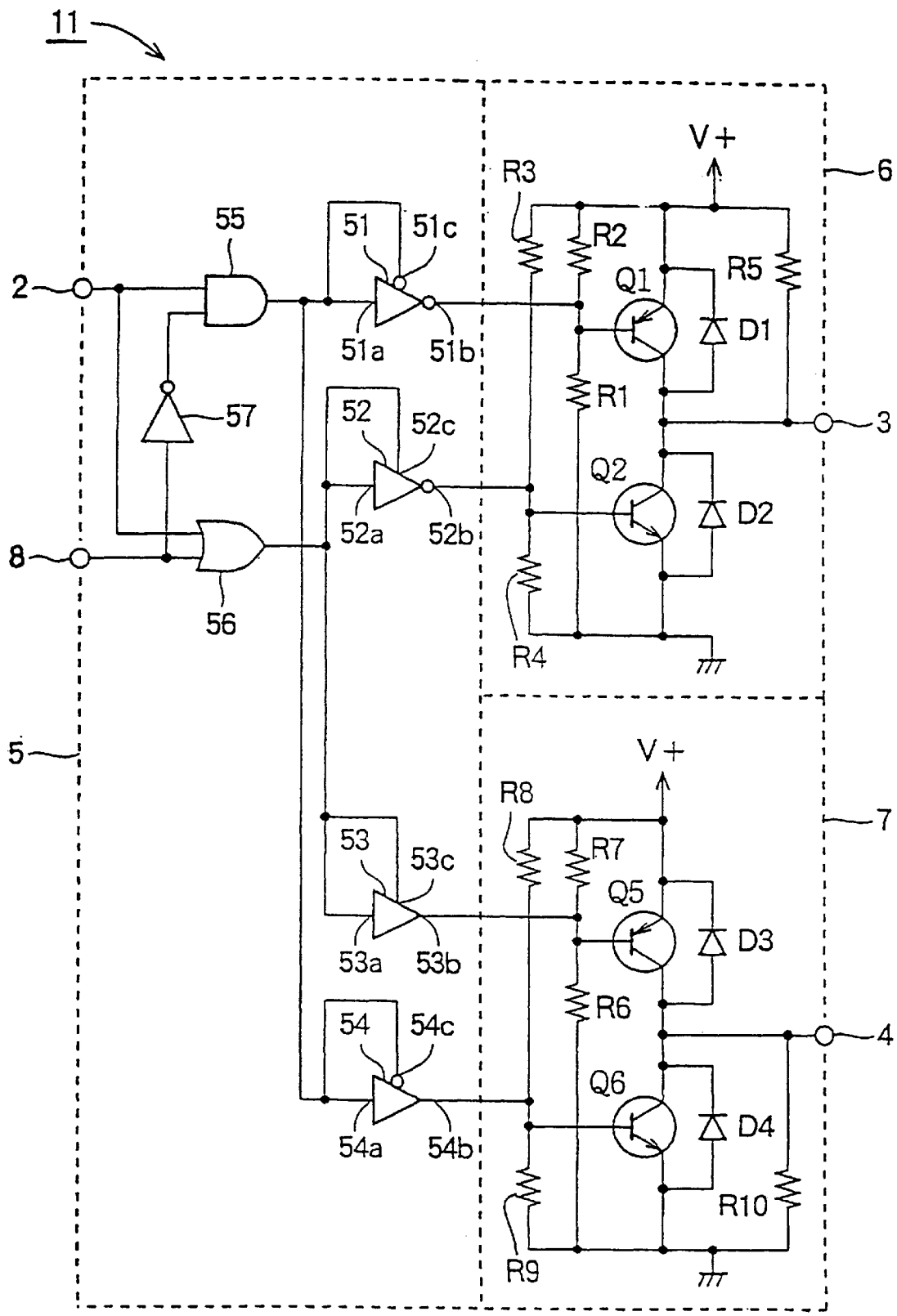
FIG. 3 is a circuit configuration diagram of a transmitting apparatus of a second embodiment as provided with a transmission stopping function.

FIG. 3 is a circuit configuration diagram of a transmitting apparatus provided with a transmission stopping function. Transmitting apparatus 11 shown in FIG. 3 is provided by adding, to transmitting apparatus 1 shown in FIG. 1, transmission stopping signal input terminal 8, AND gate 55, OR gate 56, and invertor 57, by which all of transistors Q1, Q2, Q5 and Q6 are controlled to turn off in accordance with a transmission stopping signal (idle signal) supplied to transmission stopping signal input terminal 8.

In transmitting apparatus 11, when an input signal at a High level is inputted to transmission stopping signal input terminal 8, all of the transistors Q1, Q2, Q5, and Q6 are controlled to turn off. When an input signal at a LOW level is inputted to transmission stopping signal input terminal 8, an output corresponding to the logical level of the transmitted data supplied to data input terminal 2 is generated.

In the transmission stopped state, the logical level of non-inverting output terminal 3 is held at a HIGH level through pull-up resistor R5 and the logical level of inverting output terminal 4 is held at a LOW level through pull-down resistor R10. Since all of transistors Q1, Q2, Q5, and Q6 are turned off in the transmission stopped state, current consumption at the time of stand by and the like can be suppressed.

When an input signal at a High level is inputted to transmission stopping signal input terminal 8, one input signal to AND gate 55 is brought to a LOW level through invertor 57 and the output signal from AND gate 55 is brought to a LOW level. The output signal from AND gate 55 is supplied to first three-status buffer 51 and fourth three-status buffer 54. Since the output signal from AND gate 55 is brought to a LOW level, the output signal from terminal 51b of first three-status buffer 51 is brought to a HIGH level. In view of this High level output from first three-status buffer 51, PNP transistor Q1 is brought to an OFF state. Further, since the output signal from AND gate 55 is brought to a LOW level, the output signal from output terminal 54b of fourth three-status buffer 54 is brought to a LOW level. In view of this LOW level output from output terminal 54b, NPN transistor Q6 is brought to an OFF state.

When an input signal at a High level is inputted to the transmission stopping signal input terminal 8, this HIGH level signal is supplied to second three-status buffer 52 and third three-status buffer 53 through OR gate 56. Since the output signal from OR gate 56 is brought to a HIGH level, output terminal 52b of second three-status buffer 52 is brought to a LOW level. In view of this LOW level output from output terminal 52b, NPN transistor Q2 is brought to an OFF state. Since the output signal from OR gate 56 is brought to a HIGH level, the output signal from output terminal 53b of third three-status buffer 53 is brought to a HIGH level. In view of this HIGH level output from output terminal 53b, PNP transistor Q5 is brought to an OFF state.

Figure 4:
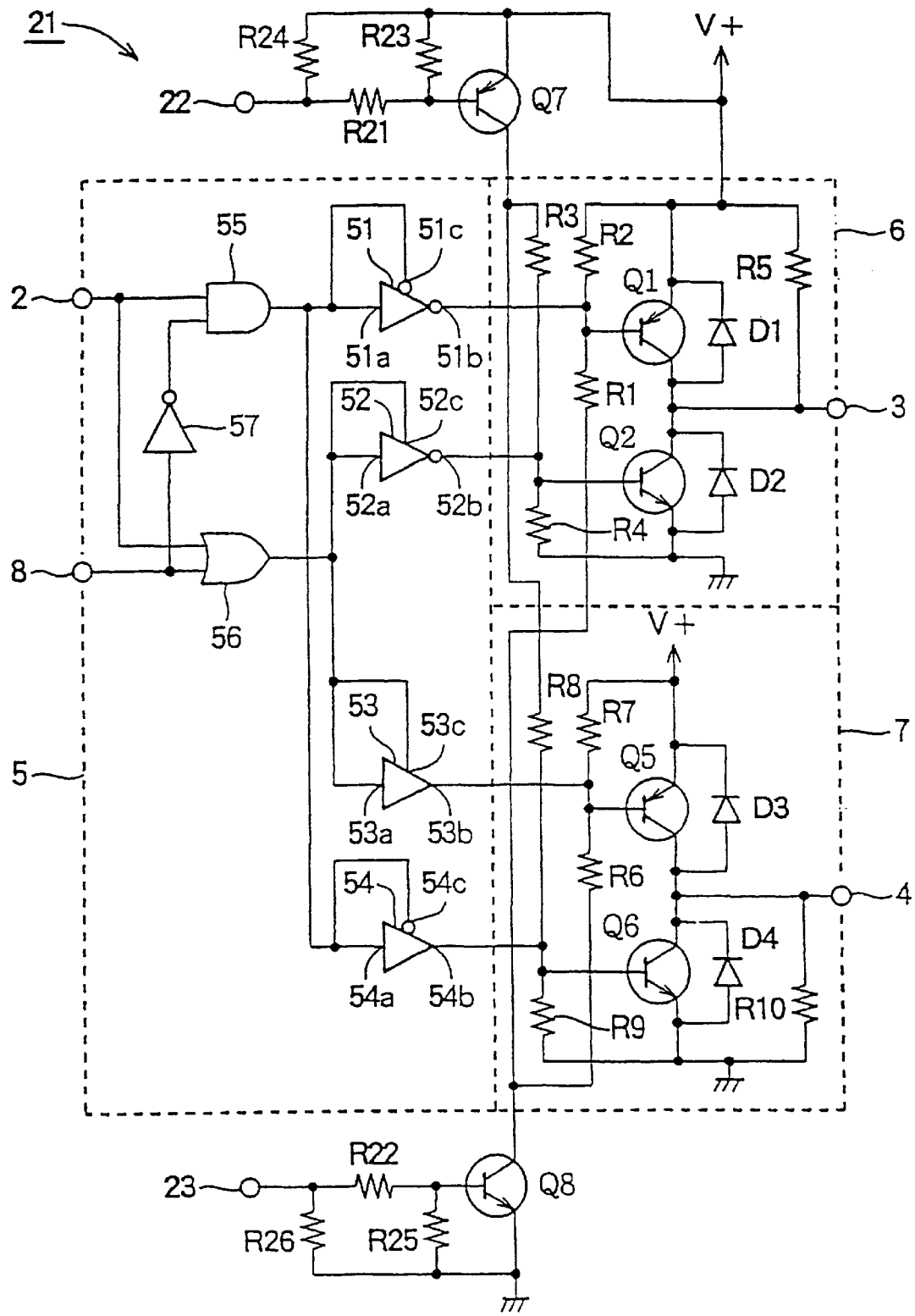
FIG. 4 is a circuit configuration diagram of a transmitting apparatus of a third embodiment as provided with a transmission stopping function and a base drive inhibiting function.

FIG. 4 is a circuit configuration diagram of a transmitting apparatus provided with a base drive inhibiting function in addition to the transmission stopping function. Transmitting apparatus 21 shown in FIG. 4 is provided by adding, to transmitting apparatus 11 shown in FIG. 3, PNP transistor Q7 for controlling the supply of base currents to NPN transistors Q2 and Q6, NPN transistor Q8 for controlling the supply of base currents to PNP transistors Q1 and Q5, and corresponding peripheral circuits of transistors Q7 and Q8.

In the transmitting apparatus shown in FIG. 1 and FIG. 3, if the operation of logical circuit portion 5 becomes unstable upon rising of the power source and all the outputs of three-status buffers 51–54 are brought to high-impedance states, there is the possibility of all transistors Q1, Q2, Q5, and Q6 turning on and short-circuiting the power source. In the transmitting apparatus 21 shown in FIG. 4, upon detection that the source voltage has reached a predetermined voltage by a voltage detection circuit or the like (not shown), first bias supply control terminal 22 is brought to a LOW level in accordance with the detected output of the source voltage. A base current is supplied through base resistor R21 to PNP transistor Q7, which has an emitter connected to positive power source V+, to turn PNP transistor Q7 ON, whereby bias voltages are supplied to outputting NPN transistors Q2 and Q6.

Further, upon detection that the source voltage has reached a predetermined voltage by a voltage detecting circuit or the like (not shown), a signal at a HIGH level is inputted to second bias supply control terminal 23 in accordance with the detected output of the source voltage. A base current is supplied through base resistor R22 to NPN transistor Q8, which has an emitter connected to ground (or a negative power source), to turn NPN transistor Q8 ON, whereby bias voltages are supplied to outputting PNP transistors Q1 and Q5.

When both PNP transistor Q7 and NPN transistor Q8 are in OFF states, no bias voltage is supplied to each of transistors Q1, Q2, Q5, and Q6. Therefore, all the outputting transistors Q1, Q2, Q5, and Q6 can be brought to OFF states regardless of the outputting state of each of three-status buffers 51–54.

Reference numeral R23 denotes a base-emitter resistor for PNP transistor Q7 and R24 denotes a pull-up resistor for first bias supply control terminal 22. The configuration may be modified such that only resistor R23 or resistor R24 are provided therein. Reference numeral R25 denotes a base-emitter resistor for NPN transistor Q8 and R26 denotes a pull-down resistor for second bias supply control terminal 23. The configuration may be modified such that only resistor R25 or resistor R26 are provided therein.

Further, it is also possible to provide such a configuration that a constant-voltage circuit constituted of a voltage regulating diode or the like, not shown, may be interposed between first bias supply control terminal 22 and second bias supply control terminal 23 and that base currents are supplied to PNP transistor Q7 and NPN transistor QB when power source V+ exceeds the regulated voltage determined by the constant-voltage circuit, transistors Q7 and Q8 are brought to ON states, and bias voltages are supplied to outputting transistors Q1, Q2, Q5, and Q6. In this case, pull-up resistor R24 and pull-down resistor R26 may be eliminated.

Figure 5:
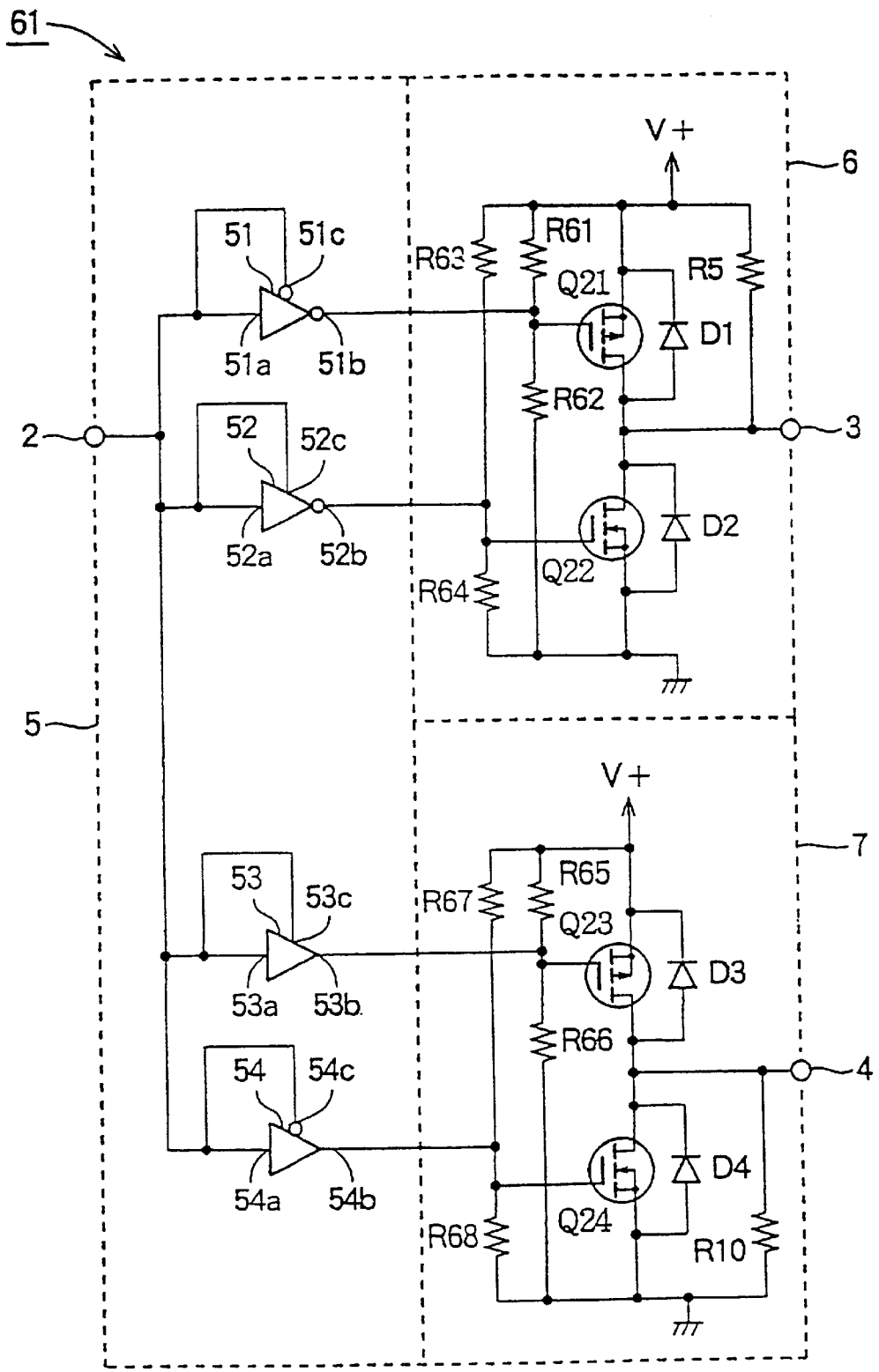
FIG. 5 is a circuit configuration diagram of a variation of the transmitting apparatus shown in FIG. 1.
Figure 6:
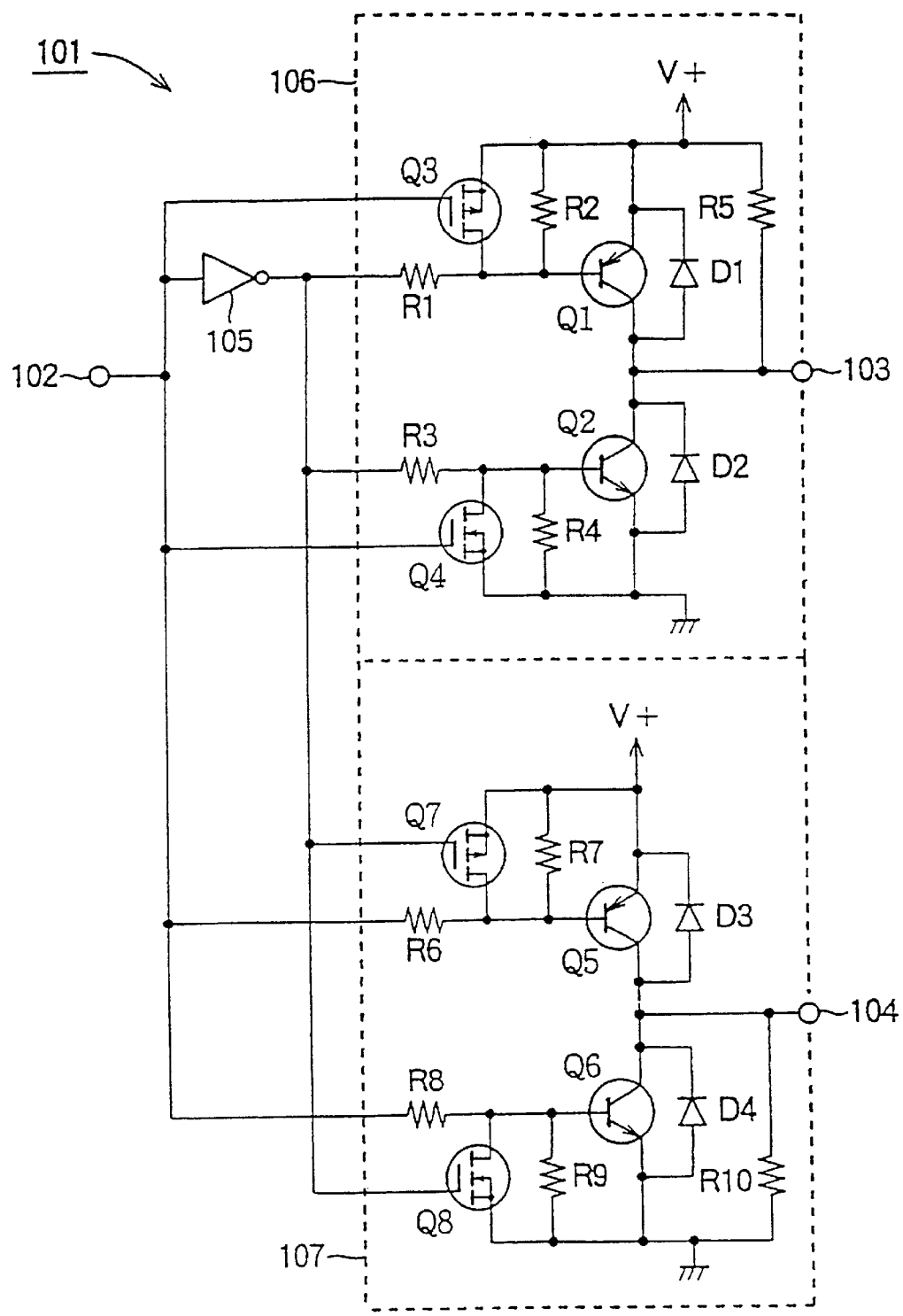
FIG. 6 is a circuit configuration diagram of a conventional transmitting apparatus.
Figure 7:
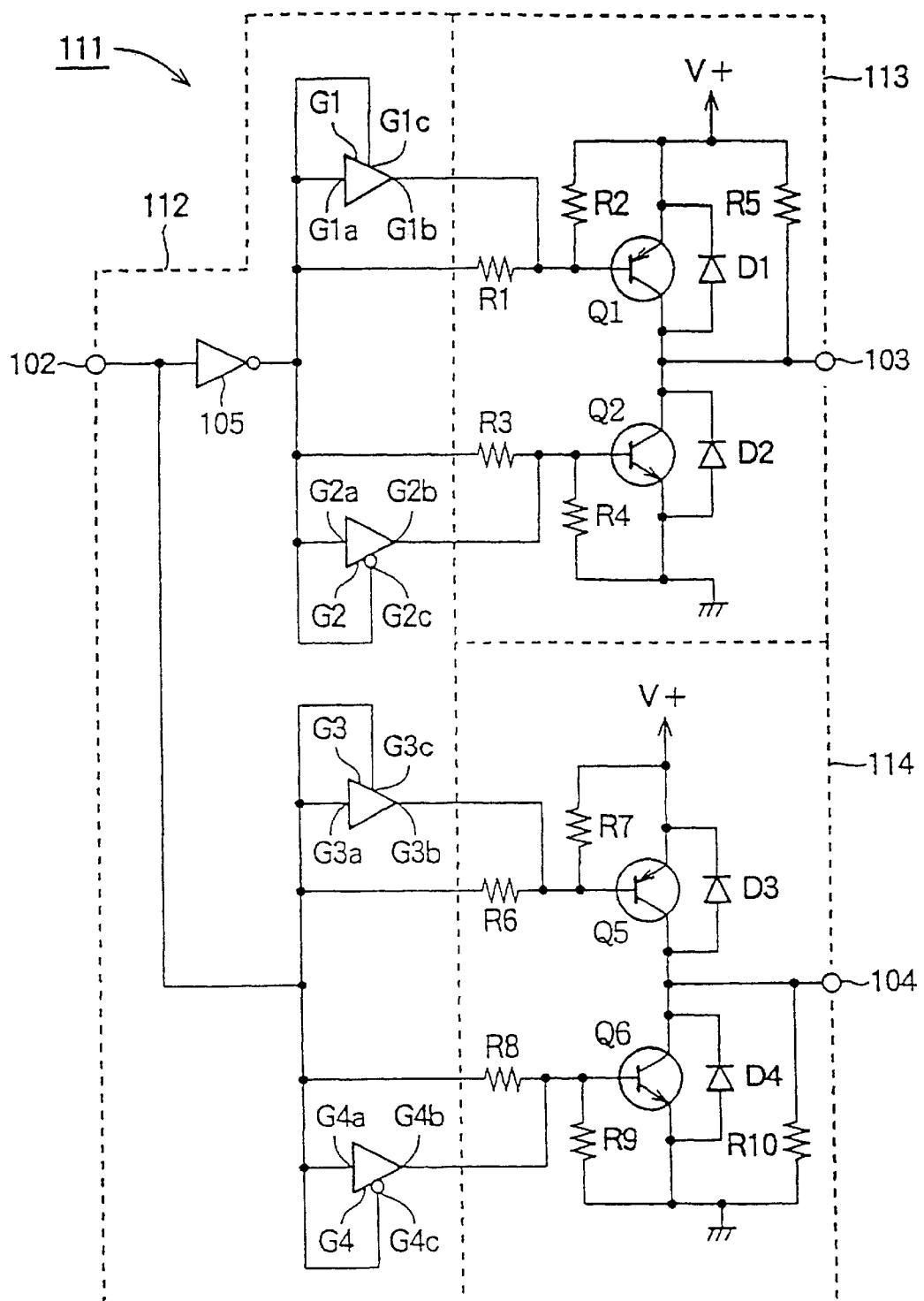
FIG. 7 is a circuit configuration diagram of a transmitting apparatus in which a design for shortening the turn off time of transistors is made by employing three-status buffers.

FIG. 5 is a circuit configuration diagram of an example of a variation of the transmitting apparatus shown in FIG. 1. Transmitting apparatus 61 of FIG. 5 is of such a configuration that P-channel enhancement field effect transistors Q21 and Q23 are used in place of output PNP transistors Q1 and Q5 shown in FIG. 1 and N-channel enhancement field effect transistors Q22 and Q24 are used in place of output NPN transistors Q2 and Q6 shown in FIG. 1.

The gate voltage necessary for controlling turning on of output P-channel enhancement field effect transistor Q21 is generated by voltage-dividing the source voltage with resistor 61 and resistor 62. The voltage generated by voltage division using resistor 61 and resistor 62 is supplied to the gate of output P-channel enhancement field effect transistor Q21.

The gate voltage necessary for controlling turning on of output N-channel enhancement field effect transistor Q22 is generated by voltage-dividing the source voltage with resistor 63 and resistor 64. The voltage generated by voltage division using resistor 63 and resistor 64 is supplied to the gate of output N-channel enhancement field effect transistor Q22.

The gate voltage necessary for controlling turning on of output P-channel enhancement field effect transistor Q23 is generated by voltage-dividing the source voltage with resistor 65 and resistor 66. The voltage generated by voltage division using resistor 65 and resistor 66 is supplied to the gate of output P-channel enhancement field effect transistor Q23.

The gate voltage necessary for controlling turning on of output N-channel enhancement field effect transistor Q24 is generated by voltage-dividing the source voltage with resistor 67 and resistor 68. The voltage generated by voltage division using resistor 67 and resistor 68 is supplied to the gate of output N-channel enhancement field effect transistor Q24.

When controlling each of field effect transistors Q21–Q24 from an ON state to an OFF state, the turn off time of each field effect transistor Q21–Q24 can be shortened by supplying, through a low impedance, the voltage for turning off each field effect transistor Q21–Q24 to the gate of each field effect transistor Q21–Q24. Further, such a configuration may be provided as shown in FIG. 5 wherein the gate voltage for bringing each field effect transistor Q21–Q24 to an OFF state is supplied via respective three-status buffers 51–54 through a low impedance.

The transmitting apparatus according to the invention as thus described is configured such that the base or gate of a transistor driven in an ON state is supplied with a voltage to control turning off of the transistor through a three-status buffer. Hence, switching operation of transistors can be controlled by having each transistor interfaced with a single signal line.

Further, since the transmitting apparatus is configured such that the voltage for controlling turning off of the transistor is output from a three-status buffer through a low impedance, the turn off time of the transistor can be shortened and a signal changing between high level and low level can be transmitted more quickly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmitting apparatus comprising:
a transmitting circuit alternately generating a high-level signal and a low-level signal and transmitting the generated signal over a communication line; and
a control circuit for providing a control signal for controlling said transmitting circuit,
said transmitting circuit comprising a first transistor for activating the communication line to a HIGH level when the control signal is at a first level and a second transistor for activating the communication line to a LOW level when the control signal is at a second level,
a potential of the low-level signal being inputted to an input terminal of said first transistor through a first resistor and a potential of the high-level signal being inputted to an input terminal of said second transistor through a second resistor,
said control circuit being connected to the input terminals of said first and second transistors, developing a high-impedance state with respect to the input terminal of said first transistor and outputting a low-level signal to the input terminal of said second transistor when the high-level signal is to be transmitted as the generated signal over the communication line, and outputting a high-level signal to the input terminal of said first transistor and developing a high-impedance state with respect to the input terminal of said second transistor when the low-level signal is to be transmitted as the generated signal over the communication line.

2. The transmitting apparatus according to claim 1, wherein said control circuit comprises plural three-status buffers.

3. The transmitting apparatus according to claim 2, wherein said first and second transistors are respective first and second bipolar transistors each having a base which are respectively the input terminals of said first and second transistors.

4. The transmitting apparatus according to claim 2, wherein said first and second transistors are field effect transistors each having a gate which are respectively the input terminals of said first and second transistors.

5. The transmitting apparatus according to claim 2, further comprising a base drive inhibiting circuit for maintaining said first and second transistors in an off state regardless of outputs of the plural three-status buffers of said control circuit.

6. The transmitting apparatus according to claim 1, wherein said control circuit comprises a transmission stopping circuit for suppressing power consumption by said transmitting circuit during an idle standby state by turning off said first and second transistors.

7. A transmission apparatus comprising:
an output circuit for alternately generating a high level signal and a low level signal for output over a communication line, said output circuit including
a first transistor for providing the high level signal to the communication line when turned on,
a second transistor providing the low level signal to the communication line when turned on, and
a bias drive circuit for providing respective bias drive currents to turn said first and second transistors on; and
a logic circuit, coupled to said output circuit, for selectively providing respective source voltages to said first and second transistors through a low impedance to turn off said first and second transistors and enabling provision of the respective bias drive currents from said bias drive circuit in accordance with an input data signal provided thereto.

8. The transmission apparatus of claim 7, wherein said logic circuit consists of:
a first three-status buffer, coupled to said first transistor, for providing a first source voltage to turn off said first transistor; and
a second three-status buffer, coupled to said second transistor, for providing a second source voltage to turn off said second transistor,
said first and second three-status buffers being respectively coupled to said logic circuit through respective single first and second signal lines.

9. The transmission apparatus of claim 8, wherein said logic circuit further consists of a transmission stopping circuit, coupled between an input terminal of said logic current via which the input data signal is provided and inputs of said first and second three-status buffers, for suppressing power consumption by said output circuit driving on an idle standby state by turning off said first and second transistors.

10. The transmission apparatus of claim 7, wherein said bias circuit comprises:

a first resistor, coupled to a negative power source within said bias drive circuit, for providing a first bias drive current to turn said first transistor on; and a second resistor, coupled to a positive power source within said bias drive circuit, for providing a second bias drive current to turn said second transistor on.

11. The transmission apparatus of claim 7, wherein said first and second transistors are bipolar transistors having respective bases coupled to both said logic circuit and said bias drive circuit.

12. The transmission apparatus of claim 7, wherein said first and second transistors are field effect transistors having respective gates coupled to both said logic circuit and said bias drive circuit.

13. The transmission apparatus of claim 7, wherein said logical circuit further comprises a transmission stopping circuit for suppressing power consumption by said output circuit during an idle standby state by turning off said first and second transistors.

14. The transmission apparatus of claim 7, further comprising a base drive inhibiting circuit, coupled to said bias drive circuit, for maintaining said first and second transistors in an off state regardless of outputs of said logic circuit.

15. A transmission apparatus comprising:

output means for alternately generating a high level signal and a low level signal for output over a communication line, said output means including, first switch means for providing the high level signal to the communication line when turned on, second switch means for providing the low level signal to the communication line when turned on, and bias drive means for providing respective bias drive currents to turn said first and second switch means on; and logic means, coupled to said output means, for selectively providing respective source voltages to said first and second switch means through a low impedance to turn off said first and second switch means and enabling provision of the respective bias drive currents from said bias drive means in accordance with an input data signal provided thereto.

16. The transmission apparatus of claim 15, wherein said logic means consists of:

first buffer means, coupled to said first switch means, for providing a first source voltage to turn off said first switch means; and second means buffer, coupled to said second switch means, for providing a second source voltage to turn off said second switch means, said first and second buffer means being respectively coupled to said logic means through respective single first and second signal lines.

17. The transmission apparatus of claim 16, wherein said logic means further consists of transmission stopping means, coupled between an input terminal of said logic means via which the input data signal is provided and inputs of said first and second buffer means, for suppressing power consumption by said output means during an idle standby state by turning off said first and second switching means.

18. The transmission apparatus of claim 17, wherein said first and second buffer means are respective three-status buffers.

19. The transmission apparatus of claim 15, wherein said bias drive means comprises:

a first resistor, coupled to a negative power source within said bias drive means, for providing a first bias drive current to turn said first switch means on; and a second resistor, coupled to a positive power source within said bias drive means, for providing a second bias drive current to turn said second switch means on.

20. The transmission apparatus of claim 15, wherein said first and second switch means are bipolar transistors having respective bases coupled to both said logic means and said bias drive means.

21. The transmission apparatus of claim 15, wherein said first and second switch means are field effect transistors having respective gates coupled to both said logic means and said bias drive means.

22. The transmission apparatus of claim 15, wherein said logic means further comprises transmission stopping means for suppressing power consumption by said output means during an idle standby state by turning off said first and second switch means.

23. The transmission apparatus of claim 15, further comprising base drive inhibiting means, coupled to said bias drive means, for maintaining said first and second switch means in an off state regardless of outputs of said logic means.

* * * * *